United States Patent
Nakajima et al.

(10) Patent No.: US 11,565,964 B2
(45) Date of Patent: Jan. 31, 2023

(54) METHOD OF MANUFACTURING POROUS GLASS PREFORM FOR OPTICAL FIBER

(71) Applicant: FURUKAWA ELECTRIC CO., LTD., Tokyo (JP)

(72) Inventors: Masaki Nakajima, Tokyo (JP); Seiichi Shinada, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 518 days.

(21) Appl. No.: 15/712,791

(22) Filed: Sep. 22, 2017

(65) Prior Publication Data

US 2018/0009699 A1    Jan. 11, 2018

Related U.S. Application Data

(63) Continuation of application No. PCT/JP2016/060634, filed on Mar. 31, 2016.

(30) Foreign Application Priority Data

Mar. 31, 2015   (JP) .............................. JP2015-072915

(51) Int. Cl.
   *C03B 37/018*   (2006.01)
   *C03B 37/012*   (2006.01)
   *C03B 37/014*   (2006.01)

(52) U.S. Cl.
   CPC ........ *C03B 37/018* (2013.01); *C03B 37/0142* (2013.01); *C03B 37/01225* (2013.01);
   (Continued)

(58) Field of Classification Search
   CPC .............. C03B 37/018; C03B 2207/70; C03B 2207/66
   See application file for complete search history.

(56) References Cited

U.S. PATENT DOCUMENTS 4,627,867 A * 12/1986 Tanaka ................ C03B 37/0142
                                                    65/421
4,731,103 A *  3/1988 Mizutani ............ C03B 37/0142
                                                    65/378
(Continued)

FOREIGN PATENT DOCUMENTS

JP    09-118539    5/1997
JP    10-114535    5/1998
(Continued)

OTHER PUBLICATIONS

Extended European Search Report dated Oct. 17, 2018 in Patent Application No. 16773100.9, 7 pages.
(Continued)

*Primary Examiner* — Lisa L Herring
(74) *Attorney, Agent, or Firm* — Oblon, McClelland, Maier & Neustadt, L.L.P.

(57) ABSTRACT

A method of manufacturing a porous glass preform includes depositing glass particles on an outer periphery of a target rod while a burner for synthesizing glass particles and the target rod that is rotating are relatively reciprocated, wherein V and r are gradually reduced while a variation in sweeping pitch P [mm] expressed as V/r is caused to be within a range of a central value±10% when a glass particle deposition layer of a portion satisfying a relation $0.5\ L \leq R \leq 0.8\ L$ is synthesized; where a final outer diameter of the manufactured porous glass preform for an optical fiber is L [mm], an outer diameter of a glass particle deposition body in the middle of the manufacture is R [mm], a rotating speed of the target rod is r [rpm], and a relative moving speed between the target rod and the burner is V [mm/min.].

19 Claims, 4 Drawing Sheets

(52) U.S. Cl.
CPC .... *C03B 37/01493* (2013.01); *C03B 2207/66* (2013.01); *C03B 2207/70* (2013.01); *Y02P 40/57* (2015.11)

(56) References Cited

U.S. PATENT DOCUMENTS

| | | | | |
|---|---|---|---|---|
| 5,152,818 | A * | 10/1992 | Berkey | C03B 37/01217 385/126 |
| 6,047,564 | A * | 4/2000 | Schaper | C03B 19/1423 65/17.4 |
| 6,324,871 | B1 * | 12/2001 | Nakamura | C03B 37/0142 65/17.4 |
| 8,516,855 | B2 * | 8/2013 | Fogliani | C03B 37/0142 65/377 |
| 2002/0020193 | A1 | 2/2002 | Shimada et al. | |
| 2005/0147367 | A1 | 7/2005 | Shimada et al. | |
| 2007/0089461 | A1 | 4/2007 | Hayami et al. | |

FOREIGN PATENT DOCUMENTS

| | | |
|---|---|---|
| JP | 2001-233634 | 8/2001 |
| JP | 2004-35282 A | 2/2004 |
| JP | 2005-139042 | 6/2005 |
| JP | 2006-199526 | 8/2006 |
| JP | 2007-106616 | 4/2007 |
| WO | WO 02/090276 A1 | 11/2002 |

OTHER PUBLICATIONS

International Search Report dated Jul. 5, 2016 in PCT/JP2016/060634 filed Mar. 31, 2016 (with English Translation).
Written Opinion dated Jul. 5, 2016 in PCT/JP2016/060634 filed Mar. 31, 2016.
Japan Notification of Reason for Refusal of JP Patent Application No. 2016-548394 (with English Translation).
Japan Decision to Grant a Patent of JP Patent Application No. 2016-548394 (with English Translation).

* cited by examiner

METHOD OF MANUFACTURING POROUS GLASS PREFORM FOR OPTICAL FIBER

CROSS-REFERENCE TO RELATED APPLICATION(S)

This application is a continuation of International Application No. PCT/JP2016/060634, filed on Mar. 31, 2016 which claims the benefit of priority of the prior Japanese Patent Application No. 2015-072915, filed on Mar. 31, 2015, the entire contents of which are incorporated herein by reference.

BACKGROUND

The present disclosure relates to a method of manufacturing a porous glass preform for an optical fiber.

In recent years, sizes of glass preforms for optical fibers have been increased to improve manufacturability of optical fibers. Glass preforms for optical fibers are manufactured by a well known manufacturing method, in which a cladding portion is made by an outside vapor phase deposition (OVD) method or a rod-in-tube (RIT) method on a target rod including a light transmitting core made by a vapor phase axial deposition (VAD) method, a modified chemical vapor deposition (MCVD) method, a plasma method, or the like. When the OVD method is used to make the cladding portion, there are two methods of increasing g the size of the porous glass preform for an optical fiber, the methods being elongating the porous glass preform, and increasing the diameter of the porous glass preform.

However, when the porous glass preform for an optical fiber is elongated, the manufacturing device therefore is increased in size, and will be constrained in terms of installation space and equipment cost thereof, and the manufactured glass preform for an optical fiber will also be difficult to be handled. Therefore, increase in the size of the porous glass preform for an optical fiber is preferably dealt with by increase in the diameter, as much as possible. Further, increase in the diameter of the porous glass preform for an optical fiber manufactured by the OVD method is naturally limited due to constraints, including the size of existing equipment. Methods of realizing increase in the size of a porous glass preform for an optical fiber in consideration of these various constraint conditions include a method of increasing the density of glass particles deposited.

However, there is a phenomenon that when the density of the glass particles deposited is increased, a portion where the deposit is bulged in a bump shape on a depositional surface of the porous glass preform for an optical fiber (hereinafter, simply referred to as "bump defect") tends to be generated. This bump defect has a property of gradually growing largely once generated during deposition of glass particles, and thus may make the porous glass preform for an optical fiber defective. Further, when a bump defect is generated at an end portion of a porous glass preform for an optical fiber, even if the bump defect does not make the entire porous glass preform for an optical fiber defective, since the portion, at which the bump defect is generated, needs to be removed, a region usable as a product will be reduced. Therefore, for prevention of reduction in the yield, the density of the glass particles deposited on the porous glass preform for an optical fiber has had to be controlled.

Further, even if the density of the glass particles deposited on the porous glass preform for an optical fiber is kept constant, depending on manufacturing conditions, a bump defect may be generated or may not be generated. Furthermore, although bump defects are known as tending to be generated when the temperature of the porous glass preform for an optical fiber being manufactured is increased too much (for example, see Japanese Patent Application Laid-open No. 10-114535), even if the temperature of the porous glass preform for an optical fiber being manufactured is kept constant, depending on the manufacturing conditions, a bump defect may be generated or may not be generated. Since the conditions, under which bump defects are generated, are unclear as described above, the density of the glass particles to be deposited on the porous glass preform for an optical fiber has to be controlled more than necessary.

There is a need for a method of manufacturing a porous glass preform for an optical fiber, the method enabling prevention of generation of a bump defect on a depositional surface.

SUMMARY

In some embodiments, a method of manufacturing a porous glass preform for an optical fiber includes: depositing glass particles on an outer periphery of a target rod while a burner for synthesizing glass particles and the target rod that is rotating are relatively reciprocated, the glass particles being synthesized by a glass making feedstock gas and a combustion gas being supplied to the burner, wherein V and r are gradually reduced while a variation in sweeping pitch P [mm] expressed as V/r is caused to be within a range of a central value±10% when a glass particle deposition layer of a portion satisfying a relation $0.5\,L \leq R \leq 0.8\,L$ is synthesized; where a final outer diameter of the manufactured porous glass preform for an optical fiber is L [mm], an outer diameter of a glass particle deposition body in the middle of the manufacture is R [mm], a rotating speed of the target rod is r [rpm], and a relative moving speed between the target rod and the burner is V [mm/min.].

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereinafter, by reference to the drawings, an embodiment of a method of manufacturing a porous glass preform for an optical fiber according to the present disclosure will be described in detail. The disclosure is not limited by this embodiment. Hereinafter, details of the method of manufacturing a porous glass preform for an optical fiber will be described as the embodiment, and thereafter, representative experiments of many experiments will be selected and disclosed as examples and a comparative example.

Embodiment

Figure 1:
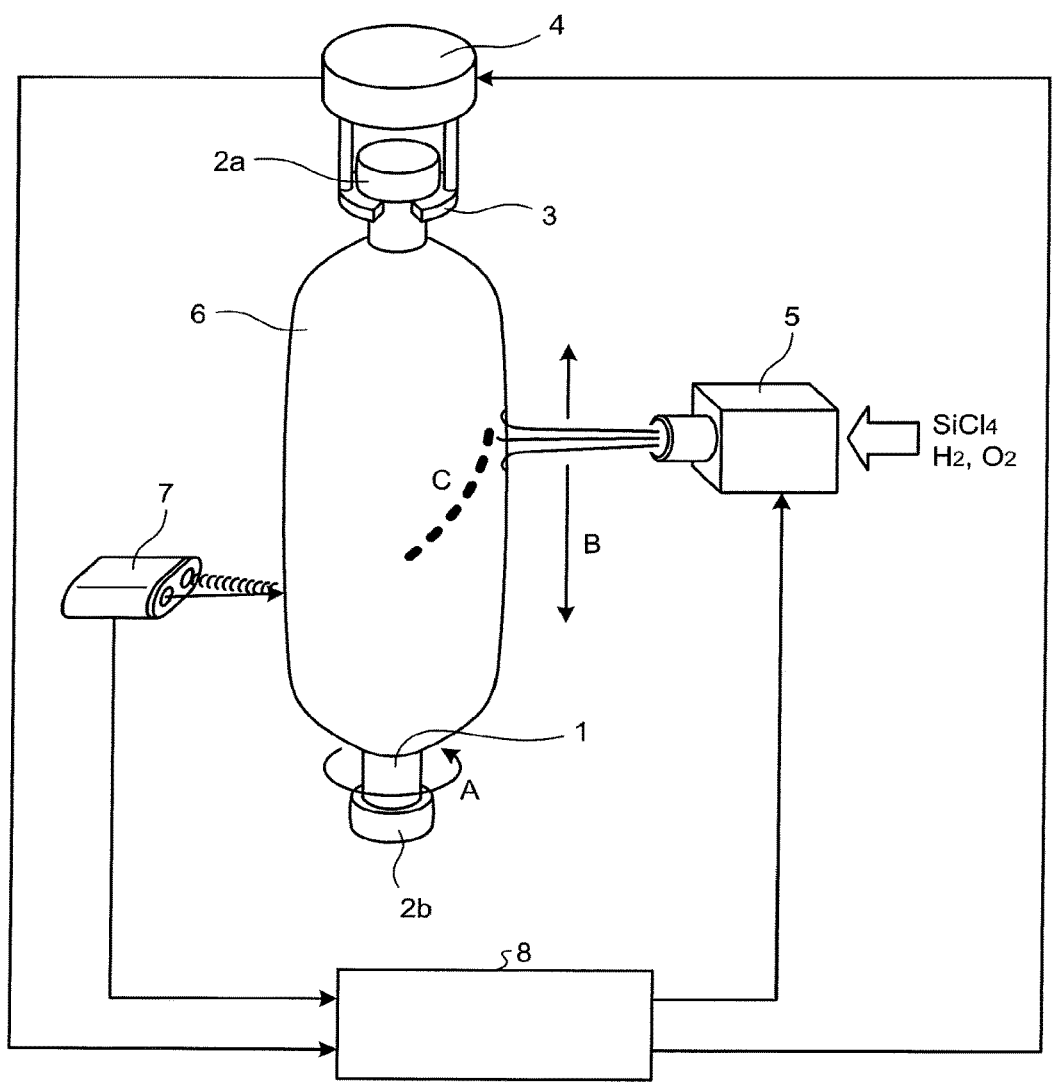
FIG. 1 is a perspective view schematically illustrating main parts of a manufacturing apparatus used in a method of manufacturing a porous glass preform for an optical fiber.

FIG. 1 is a perspective view schematically illustrating main parts of a manufacturing apparatus used in the method of manufacturing a porous glass preform for an optical fiber. In the description of this embodiment, a manufacturing method by an OVD method will be used as an example of the method of manufacturing a porous glass preform for an optical fiber, but implementation of the present disclosure is not limited to the OVD method, and may be applied to a general method of manufacturing a porous glass preform for an optical fiber, in which glass particles are deposited on an outer periphery of a target rod while a burner for synthesizing glass particles and the target rod that is rotating are relatively reciprocated, the glass particles being synthesized by a glass making feedstock gas and a combustion gas being supplied to the burner.

The OVD method is a manufacturing method, in which glass particles are deposited on a target rod 1, by a glass making feedstock gas being blown with flame, from outside the target rod 1. An example of the manufacturing apparatus used in this OVD method includes, as illustrated in FIG. 1, as main parts thereof, a chuck 3, a rotation drive mechanism 4, a burner 5, an outer diameter measuring device 7, and a control unit 8.

The target rod 1 that is typical is a core rod formed by vitrification of: a material forming a core in an optical fiber that is an end product; and a material forming a part of a cladding therearound. There is also a manufacturing method, in which the target rod 1 is pulled out after a glass particle deposition layer has been deposited, and the structure of the target rod 1 may be selected and used according to a use thereof.

At both ends of the target rod 1, support portions 2a and 2b are provided, and the target rod 1 is freely rotatably supported about an axis via the chuck 3. In FIG. 1, illustration of a structure of a chuck or the like attached to the support portion 2b is omitted.

The rotation drive mechanism 4 includes a motor and a weight sensor. The motor is for rotating the target rod 1 via the chuck 3 as illustrated with an arrow A, and the weight sensor is for measuring weight of the glass particles that have deposited on the target rod 1.

To the burner 5, $SiCl_4$ gas, which is the glass making feedstock gas, and $H_2$ gas and $O_2$ gas, which are combustion gases, are supplied; and the burner 5 is for synthesizing glass particles by causing flame hydrolysis of the glass making feedstock gas in flame formed by the combustion gases. The glass particles are deposited on the target rod 1 by being jetted out to an outer periphery of the target rod 1 that is rotating. The glass particle deposition layer deposited on the target rod 1 as described above is called soot 6.

The burner 5 is, as illustrated with arrows B, configured to linearly reciprocate in a rotation axis direction of the target rod 1. The burner 5 just needs to linearly reciprocate relatively to the target rod 1, and thus the burner 5 may be fixed and the target rod 1 may be linearly reciprocated in the rotation axis direction. Hereinafter, without identifying which one of the burner 5 and the target rod 1 is moving, a relative moving speed between the burner 5 and the target rod 1 will simply be referred to as a moving speed of the burner 5.

The target rod 1 is driven to rotate in the direction of the arrow A by the rotation drive mechanism 4. The burner 5 linearly reciprocates as illustrated with the arrows B. As a result, when positions swept over on a depositional surface of the soot 6 on the target rod 1 are plotted, a spiral locus as illustrated with a broken line C is drawn. Therefore, by rotating speed of the target rod 1 and the moving speed of the burner 5 being adjusted appropriately, the glass particles jetted out from the burner 5 are evenly deposited on the target rod 1.

The outer diameter measuring device 7 is a measuring device for measuring thickness of the soot 6 deposited on the target rod 1. The outer diameter measuring device 7 may be formed by use of, for example, a reflection type displacement meter. That is, the outer diameter measuring device 7 measures a distance between the outer diameter measuring device 7 and a surface of the soot 6 by: irradiating the surface of the soot 6 with a laser beam at a predetermined angle; and detecting, with a line sensor or the like, a position, at which the laser beam returns to the outer diameter measuring device 7, the laser beam having been reflected by the surface of the soot 6. If the distance between the outer diameter measuring device 7 and a surface of the target rod 1 is measured beforehand, a thickness of the soot 6 is able to be calculated from the distance between the outer diameter measuring device 7 and the surface of the soot 6. An intermediate product including the target rod 1 and the soot 6 is referred to as a glass particle deposition body, and an outer diameter of this glass particle deposition body is also called a soot diameter.

The control unit 8 is configured to control the rotation drive mechanism 4 and the burner 5, based on output of the weight sensor provided in the rotation drive mechanism 4 and output of the outer diameter measuring device 7. As described already, the weight sensor is able to measure the weight of the soot 6 deposited on the target rod 1, and the outer diameter measuring device 7 is able to measure the thickness of the soot 6 deposited on the target rod 1. Therefore, the control unit 8 is able to calculate a density of the soot 6 deposited on the target rod 1. The control unit 8 may obtain time series histories of thickness and weight of the soot 6 deposited on the target rod 1, and obtain a density of the soot 6 at an arbitrary soot diameter position from differential information of these time series histories.

The control unit 8 monitors the density of the soot 6 that is obtained as described above, and controls: rotating speed of the motor of the rotation drive mechanism 4; the moving speed of the burner 5; and gas conditions of the glass making feedstock gas jetted out from the burner 5. The obtained density of the soot 6 may be reflected in the rotating speed of the motor of the rotation drive mechanism 4, the moving speed of the burner 5, and the like by automatic processing, or may be reflected in the rotating speed of the motor of the rotation drive mechanism 4, the moving speed of the burner 5, and the like via operation by an operator. The rotating speed of the motor of the rotation drive mechanism 4, the moving speed of the burner 5, and the gas conditions of the glass making feedstock gas jetted out from the burner 5 in subsequent manufacture may be determined by statistical utilization of obtained data of the density of the soot 6.

For comparison and reference, a conventional method of manufacturing a porous glass preform for an optical fiber will be described. In the conventional manufacturing method, a porous glass preform for an optical fiber is manufactured; by the moving speed of the burner 5 and the rotating speed of the target rod 1 being made constant and only the gas conditions (flow rate and the like) of the glass making feedstock gas jetted out from the burner 5 being controlled, while the same porous glass preform for an optical fiber is being manufactured.

However, when the density $\rho_c$ [g/cm$^3$] of the soot 6 is high, for example, equal to or higher than 0.65, a porous glass preform for an optical fiber with a sufficiently homogeneous density is difficult to be manufactured by the control of only the gas conditions of the glass making feedstock gas jetted out from the burner 5. Accordingly, a need arises, for adjustment of, not only the gas conditions of the glass making feedstock gas jetted out from the burner 5, but also the moving speed of the burner 5 and the rotating speed of the target rod 1.

At an initial stage of synthesis of a porous glass preform for an optical fiber, since the outer diameter of the glass particle deposition body is small, in general, the higher the moving speed of the burner 5 and the rotating speed of the target rod 1 are set, the higher the deposition efficiency of the glass particles is. However, when the outer diameter of the glass particle deposition body becomes large to a certain extent at an intermediate stage of the synthesis, if the moving speed of the burner 5 or the rotating speed of the target rod 1 is fast, the density of the glass particles that are deposited is decreased. Accordingly, as the synthesis proceeds, the density of the glass particles is adjusted to be kept within a desired range by the moving speed of the burner 5 and the rotating speed of the target rod 1 being gradually decreased.

However, frequency of generation of a bump defect on the depositional surface is known to be increased when the density of the glass particles that are deposited is excessively increased. Therefore, for prevention of reduction in the yield, the density of the glass particles to be deposited on the porous glass preform for an optical fiber needs to be controlled.

As a result of detailed experiments, the inventors of the present disclosure have confirmed that a bump defect may be generated or may not be generated even if the density of glass particles is the same. Further, the frequency of generation of a bump defect has been found to be correlated with variation in sweeping pitch, in which the burner 5 sweeps on the depositional surface of the soot 6 on the target rod 1. That is, it has been found that the frequency of generation of a bump defect is able to be reduced if the variation in the sweeping pitch is reduced.

When the rotating speed of the target rod 1 is "r [rpm]" and the relative moving speed between the target rod 1 and the burner 5 is "V [mm/min.]", a sweeping pitch P is a quantity defined by a ratio therebetween, "V/r [mm]". This sweeping pitch P (=V/r) represents a distance over which the burner 5 relatively moves in the rotation axis direction while the target rod 1 makes one rotation.

Further, it has been confirmed that it is important for the variation in the sweeping pitch P to be reduced in a predetermined range in manufacture of the porous glass preform for an optical fiber. Specifically, when the final outer diameter of the manufactured porous glass preform for an optical fiber is "L [mm]", and the outer diameter of the glass particle deposition body in the middle of the synthesis is "R [mm]", reduction of the variation in the sweeping pitch P is effective in synthesis of the soot 6 that is in a range where a relation $$0.5\ L \leq R \leq 0.8\ L$$

is satisfied.

It has been found that the manufacture of the porous glass preform for an optical fiber according to the above described conditions also enables reduction in the generation rate of bump defects in at least a case where the density $\rho_c$ [g/cm$^3$] of the soot 6 deposited per unit time is high at 0.90 or less.

Reasons for the generation of bump defects being able to be reduced by the reduction of the variation in the sweeping pitch P [mm] of the burner 5 as described above are considered to be that: a portion where a drastic change in state, such as density, occurs is reduced, since the flame of the burner 5 is able to be hit against the glass particle deposition body at a constant speed by the reduction in the variation of the sweeping pitch P [mm] of the burner 5, and the temperature of the glass particle deposition body is not drastically changed.

Further, reasons for the variation in the sweeping pitch P [mm] of the burner having large influence upon deposition of the soot 6 in the range where $0.5\ L \leq R \leq 0.8\ L$ when the final outer diameter of the porous glass preform for an optical fiber is "L [mm]" are considered to be as follows.

When the outer diameter R of the glass particle deposition body in the middle of the synthesis is less than 0.5 L, since the outer diameter of the glass particle deposition body is small, in order for the deposition efficiency to be increased, glass particles are deposited at comparatively high moving speed of the burner 5 and rotating speed of the target rod 1. As a result, bump defects are inherently hard to be generated. As understood when later presented examples and comparative example are seen, in a range where the outer diameter R of the glass particle deposition body in the middle of the synthesis satisfies the relation, R<0.5 L, the moving speed of the burner 5 and the rotating speed of the target rod 1 are drastically decreased, but influence on generation of bump defects is actually not observed.

On the contrary, when the outer diameter R of the glass particle deposition body in the middle of the synthesis is larger than 0.8 L: since the outer diameter of the glass particle deposition body is sufficiently large and even if the moving speed of the burner 5 and the rotating speed of the target rod 1 are decreased, the density is hard to be increased; a drastic change in state, such as the density, is not caused and bump defects are hard to be generated.

As understood from the above description, the range of the outer diameter R of the glass particle deposition body, the range enabling reduction of the variation in the sweeping pitch P, may be prescribed by the moving speed of the burner 5 and the rotating speed of the target rod 1. That is, a process of manufacturing a porous glass preform for an optical fiber is divided into: an initial stage of synthesis when the moving speed of the burner 5 and the rotating speed of the target rod 1 are reduced comparatively quickly; an intermediate stage of the synthesis when the moving speed of the burner 5 and the rotating speed of the target rod 1 are reduced comparatively slowly; and a later stage of the synthesis when the moving speed of the burner 5 and the rotating speed of the target rod 1 are reduced even more slowly but the density is hard to be increased; and variation in the sweeping pitch P is reduced in the intermediate stage of the synthesis.

In this case, as to the ranges related to the outer diameter R of the glass particle deposition body in the middle of the synthesis, the range where R<0.5 L corresponds to the initial stage of the synthesis, the range where $0.5\ L \leq R \leq 0.8\ L$ corresponds to the intermediate stage of the synthesis, and the range where R>0.8 L corresponds to the later stage of the synthesis.

Further, for realization of increase in size of a porous glass preform for an optical fiber, the density of glass particles to be deposited needs to be increased. Particularly, the density tends to be reduced at the later stage of the synthesis, but in a region where the outer diameter R of the glass particle deposition body is equal to or larger than 0.5 L, the density $\rho_c$ [g/cm$^3$] is preferably equal to or larger than 0.65, and more preferably equal to or larger than 0.70. Even if the density $\rho_c$ [g/cm$^3$] is high at 0.85 or less, by the variation in the sweeping pitch P being maintained within a range of a central value±10%, generation of bump defects is able to be prevented sufficiently. Further, if at least the density $\rho_c$ [g/cm$^3$] is equal to or less than 0.90, by the variation in the sweeping pitch P being maintained within the range of the central value±10%, generation of bump defects is able to be prevented to an acceptable extent.

Figure 2:
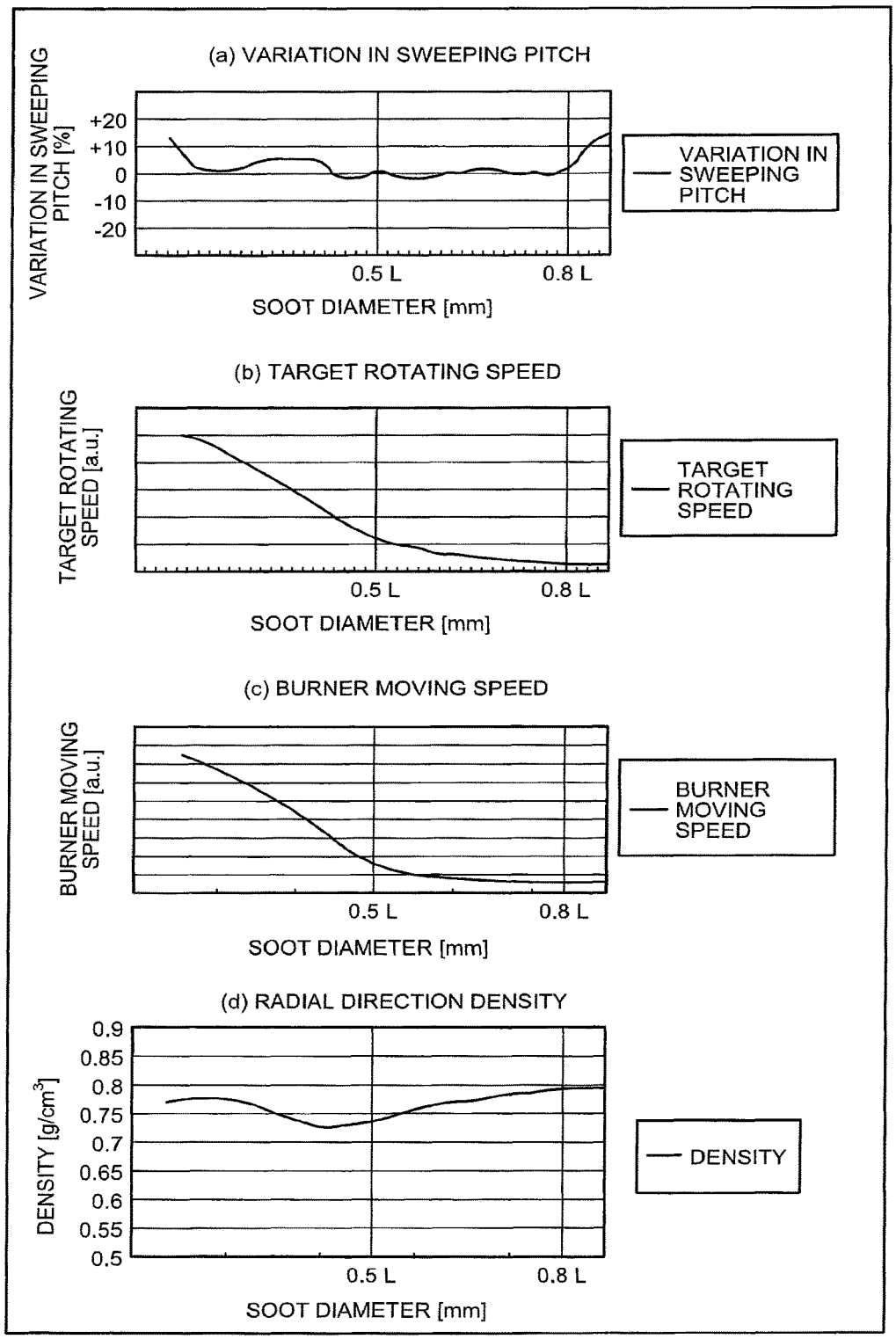
FIG. 2 is a diagram illustrating manufacturing data for a porous glass preform for an optical fiber, for which a density $\rho_c$ [g/cm$^3$] of soot to be deposited per unit time is equal to or less than 0.85.
Figure 3:
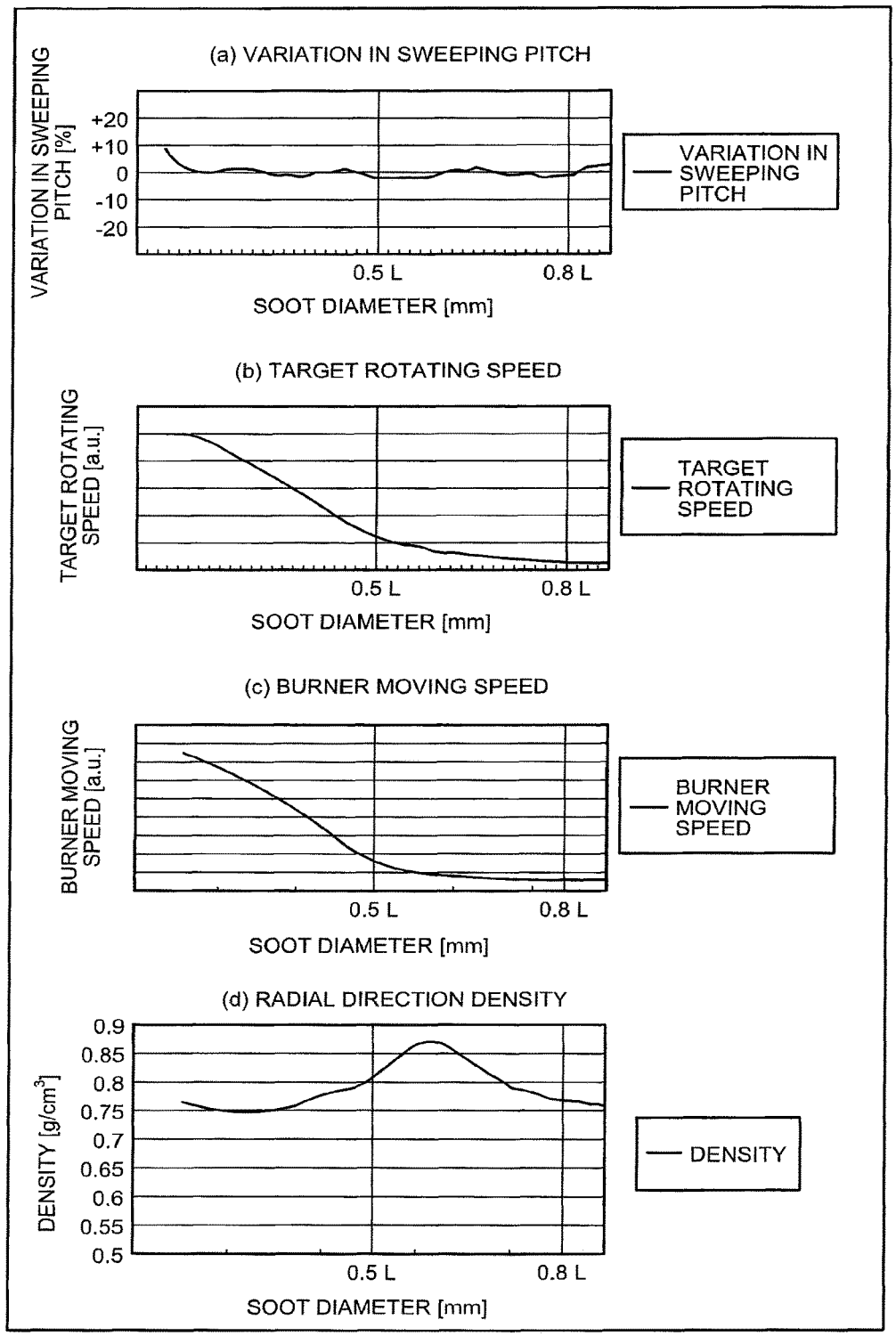
FIG. 3 is a diagram illustrating manufacturing data for a porous glass preform for an optical fiber, the porous glass preform including a portion, for which a density $\rho_c$ [g/cm$^3$] of soot to be deposited per unit time is larger than 0.85 and equal to or less than 0.90.
Figure 4:
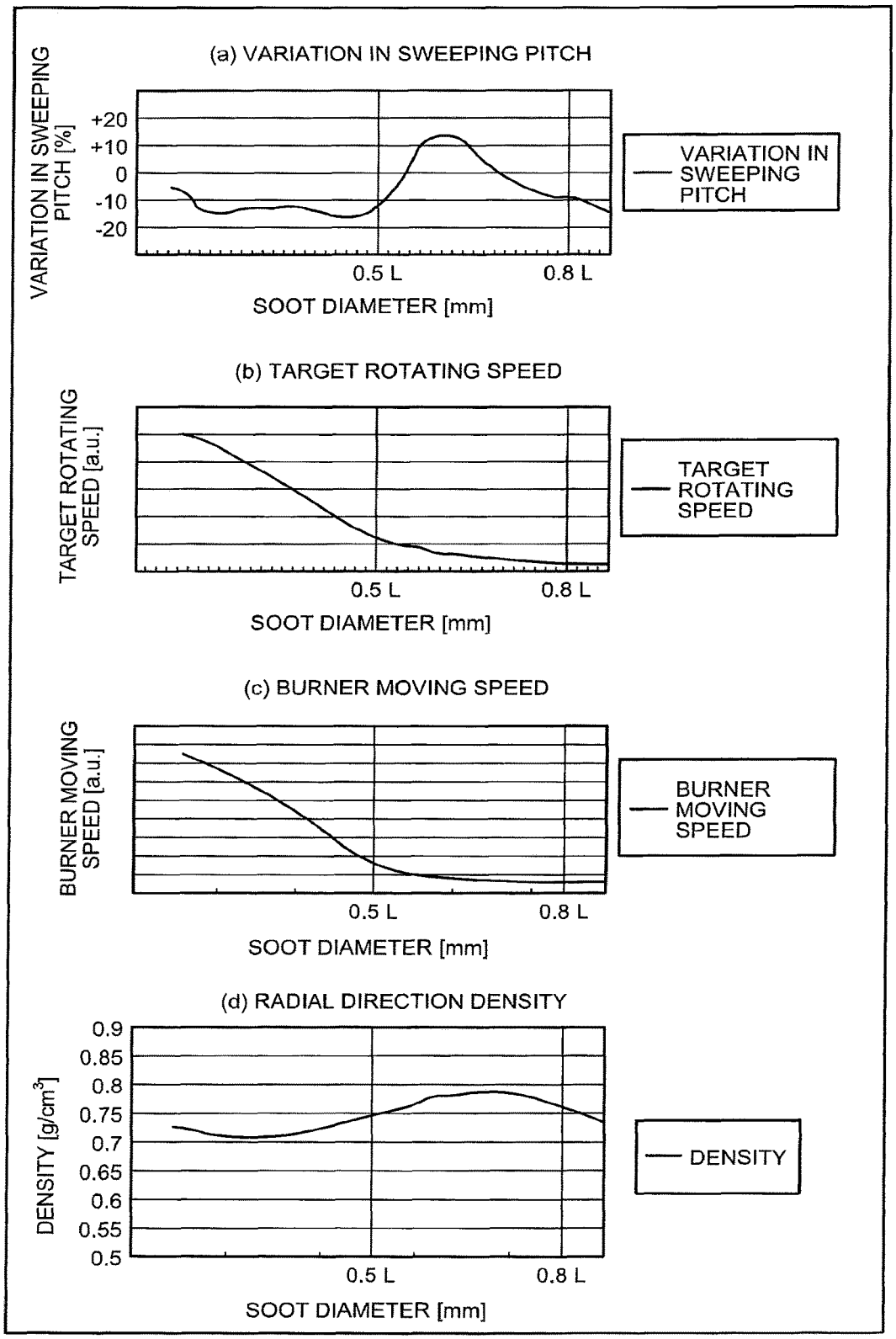
FIG. 4 is a diagram illustrating manufacturing data for a porous glass preform for an optical fiber, for which variation in sweeping pitch became outside a range of a central value±10%.

Hereinafter, some of manufacturing data for porous glass preforms for optical fibers obtained in verification experiments of the present disclosure will be disclosed in FIG. 2 to FIG. 4. FIG. 2 and FIG. 3 are manufacturing data for porous glass preforms for optical fibers according to the above described manufacturing conditions; and in particular, FIG. 2 is manufacturing data for a porous glass preform for an optical fiber, in which the density $\rho_c$ [g/cm$^3$] of soot deposited per unit time is equal to or less than 0.85 (First Example), and FIG. 3 is manufacturing data for a porous glass preform for an optical fiber, the porous glass preform including a portion, in which the density $\rho_c$ [g/cm$^3$] of soot deposited per unit time is larger than 0.85 and equal to or less than 0.90 (Second Example). Further, FIG. 4 is manufacturing data for a porous glass preform for an optical fiber, in which variation in sweeping pitch became outside a range of a central value±10% (Comparative Example).

A variation in sweeping pitch (%) is a value found by ("sweeping pitch at arbitrary position"–"central value of sweeping pitch")/"central value of sweeping pitch"×100. A central value of sweeping pitch is an average value of a maximum value and a minimum value of sweeping pitch when the outer diameter R of a glass particle deposition body in the middle of synthesis is within a range where 0.5 L≤R≤0.8 L.

First Example

In a method of manufacturing the porous glass preform for an optical fiber of First Example, the outer diameter of the target rod is 40 mm, and the outer diameter of the porous glass preform for an optical fiber at the end of the synthesis is about 250 mm.

The rotating speed of the target rod and the moving speed of the burner are, as illustrated at (b) and (c) in FIG. 2, comparatively drastically decreased at an initial stage of the synthesis, and gradually decreased at an intermediate stage of the synthesis. Further, as illustrated at (a) in FIG. 2, the variation in sweeping pitch is maintained within the range of the central value±10% at the intermediate stage of the synthesis.

Under the above described conditions, the porous glass preform for an optical fiber was manufactured by the rotating speed of the target rod and the moving speed of the burner being controlled such that the density $\rho_c$ [g/cm$^3$] of the soot deposited per unit time became equal to or less than 0.85.

As illustrated at (d) in FIG. 2, in the manufacture of the porous glass preform for an optical fiber under the above described conditions, the density $\rho_c$ of the soot is able to be maintained such that 0.65≤$\rho_c$≤0.85. Further, no bump defects were detected in the manufactured porous glass preform for an optical fiber.

Second Example

In a method of manufacturing the porous glass preform for an optical fiber of Second Example, similarly to First Example, the outer diameter of the target rod is 40 mm, and the outer diameter of the porous glass preform for an optical fiber at the end of the synthesis is about 250 mm.

The rotating speed of the target rod and the moving speed of the burner are, as illustrated at (b) and (c) in FIG. 3, comparatively drastically decreased at an initial stage of the synthesis, and gradually decreased at an intermediate stage of the synthesis. As illustrated at (a) in FIG. 3, in Second Example also, similarly to First Example, the variation in the sweeping pitch at the intermediate stage of the synthesis is maintained within the range of the central value±10%.

Under the above described conditions, the porous glass preform for an optical fiber was manufactured by the rotating speed of the target rod and the moving speed of the burner being controlled such that the density $\rho_c$ [g/cm$^3$] of the soot deposited per unit time became equal to or less than 0.90.

As illustrated at (d) in FIG. 3, in the manufacture of the porous glass preform for an optical fiber under the above described conditions, the density $\rho_c$ of the soot is able to be maintained such that 0.65≤$\rho_c$≤0.90. Further, the manufactured porous glass preform for an optical fiber included a portion having high density larger than 0.85 [g/cm$^3$] and equal to or less than 0.90 [g/cm$^3$], but no bump defects were detected.

Comparative Example

In a method of manufacturing the porous glass preform for an optical fiber of Comparative Example, similarly to the examples, the outer diameter of the target rod is 40 mm, and the outer diameter of the porous glass preform for an optical fiber at the end of the synthesis is about 250 mm.

The rotating speed of the target rod and the moving speed of the burner are, similarly to the examples, as illustrated at (b) and (c) in FIG. 4, comparatively drastically decreased at an initial stage of the synthesis, and gradually decreased at an intermediate stage of the synthesis. On the contrary, as illustrated at (a) in FIG. 4, differently from the examples, the variation in the sweeping pitch is not maintained within the range of the central value±10% at the intermediate stage of the synthesis.

In the manufacture of the porous glass preform for an optical fiber under these conditions, as illustrated at (d) in FIG. 4, although the density $\rho_c$ of the soot was able to be maintained such that 0.65≤$\rho_c$≤0.85, a bump defect was detected in the manufactured porous glass preform for an optical fiber.

Summary of Verification Experiments

Results of verification experiments also including examples other than the above disclosed examples will now be summarized. Table 1 below summarizes generation rates of bump defects when the variation in the sweeping pitch of the burner was changed.

TABLE 1

| Variation in sweeping pitch | Synthesized number | Number of bump defects detected | Generation rate |
|---|---|---|---|
| Outside range of ±10% | 30 | 9 | 30% |
| Outside range of ±5% and within range of ±10% | 30 | 2 | 7% |
| Within range of ±5% | 30 | 1 | 3% |

Samples of the verification experiments listed in Table 1 above were obtained under the following conditions. In manufacture of porous glass preforms for optical fibers, when soot in a range where 0.5 L≤R≤0.8 L is deposited, the rotating speed r [rpm] of the target rod is gradually decreased in a range of 200 to 20, and the moving speed V [mm/min.] of the burner is reduced in a range of 4000 to 400. Upon this manufacture, the central value of the sweeping pitch P=V/r is, for example, 20.0. However, since the appropriate central value of the sweeping pitch P=V/r changes according to various conditions, such as gas conditions, and the size of the porous preform to be manufactured; an appropriate value may be selected by a suitable value being derived experimentally.

As evident from Table 1, the smaller the variation in the sweeping pitch P of the burner is, the more preferable it is. Specifically, when the variation in the sweeping pitch P is within the range of the central value±10%, it is sufficiently effective, and when the variation in the sweeping pitch P is within the range of the central value±5%, it is even more effective.

Specifically, when the variation in the sweeping pitch P was outside the range of the central value±10%, the generation rate of bump defects was 30%, and when the variation in the sweeping pitch P was outside the range of the central value±5% and within the range of the central value±10%, the generation rate of bump defect was reduced to about 7% and the generation rate of bump defects is thus considerably reduced. Further, when the variation in the sweeping pitch P was within the range of the central value±5%, the generation rate of bump defects was reduced to about 3%.

The present disclosure has been described above according to the embodiment, but the present disclosure is not limited by the description and drawings forming a part of disclosure of the present disclosure through the embodiment. That is, any other embodiments, examples, operation techniques, and the like made by those skilled in the art and the like based on the embodiment are all included in the scope of the present disclosure.

INDUSTRIAL APPLICABILITY

As described above, a method of manufacturing a porous glass preform for an optical fiber according to the present disclosure is useful in increasing the size of the porous glass preform for an optical fiber, and in particular, suitable for increasing the density of the porous glass preform for an optical fiber.

A method of manufacturing a porous glass preform for an optical fiber according to the present disclosure has an effect of enabling prevention of generation of a bump defect on a depositional surface.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A method of manufacturing a porous glass preform for an optical fiber, comprising:
   forming glass particle deposition layers by depositing glass particles on an outer periphery of a target rod while the target rod rotates and while a burner for synthesizing glass particles and the target rod that is rotating are relatively reciprocated, the glass particles being synthesized by a glass making feedstock gas and a combustion gas being supplied to the burner, the glass particle deposition layers increasing an outer diameter of the target rod;
   reducing a rotating speed of the target rod r [rpm] and a relative moving speed between the target rod and the burner V [mm/min.]; and
   maintaining a variation in sweeping pitch P [mm], expressed as V/r, to be within a range of a central value±10% while the outer diameter satisfies a relation $$0.5\ L \leq R \leq 0.8\ L$$

wherein a final outer diameter of the porous glass preform for an optical fiber is L [mm], an outer diameter of a glass particle deposition body in a middle of the porous glass preform is R [mm], and
   wherein a central value is an average value of a maximum value and a minimum value of the sweeping pitch when the outer diameter of a glass particle deposition body in a middle of synthesis is within a range where $0.5\ L \leq R \leq 0.8\ L$.

2. The method of manufacturing the porous glass preform for an optical fiber according to claim 1, wherein the variation in the sweeping pitch P [mm] of the burner is within a range of the central value±5%.

3. The method of manufacturing the porous glass preform for an optical fiber according to claim 1, wherein a density $\rho_c$ [g/cm$^3$] of a glass particle deposition layer deposited per unit time is equal to or less than 0.90.

4. The method of manufacturing the porous glass preform for an optical fiber according to claim 2, wherein a density $\rho_c$ [g/cm$^3$] of a glass particle deposition layer deposited per unit time is equal to or less than 0.90.

5. The method of manufacturing the porous glass preform for an optical fiber according to claim 3, wherein the density $\rho_c$ [g/cm$^3$] of the glass particle deposition layer deposited per unit time is equal to or less than 0.85.

6. The method of manufacturing the porous glass preform for an optical fiber according to claim 4, wherein the density $\rho_c$ [g/cm$^3$] of the glass particle deposition layer deposited per unit time is equal to or less than 0.85.

7. The method of manufacturing the porous glass preform for an optical fiber according to claim 1, wherein a density $\rho_c$ [g/cm$^3$] of a glass particle deposition layer deposited per unit time is equal to or larger than 0.65.

8. The method of manufacturing the porous glass preform for an optical fiber according to claim 2, wherein a density $\rho_c$ [g/cm$^3$] of a glass particle deposition layer deposited per unit time is equal to or larger than 0.65.

9. The method of manufacturing the porous glass preform for an optical fiber according to claim 3, wherein the density $\rho_c$ [g/cm$^3$] of the glass particle deposition layer deposited per unit time is in a range of 0.65 to 0.90, inclusive.

10. The method of manufacturing the porous glass preform for an optical fiber according to claim 4, wherein the density $\rho_c$ [g/cm$^3$] of the glass particle deposition layer deposited per unit time is in a range of equal to or larger than 0.65 to 0.90, inclusive.

11. The method of manufacturing the porous glass preform for an optical fiber according to claim 5, wherein the density $\rho_c$ [g/cm$^3$] of the glass particle deposition layer deposited per unit time is in a range of 0.65 to 0.85, inclusive.

12. The method of manufacturing the porous glass preform for an optical fiber according to claim 6, wherein the density $\rho_c$ [g/cm$^3$] of the glass particle deposition layer deposited per unit time is in a range of 0.65 to 0.85, inclusive.

13. The method of manufacturing the porous glass preform for an optical fiber according to claim 7, wherein the density $\rho_c$ [g/cm³] of the glass particle deposition layer deposited per unit time is equal to or larger than 0.70.

14. The method of manufacturing the porous glass preform for an optical fiber according to claim 8, wherein the density $\rho_c$ [g/cm³] of the glass particle deposition layer deposited per unit time is equal to or larger than 0.70.

15. The method of manufacturing the porous glass preform for an optical fiber according to claim 9, wherein the density $\rho_c$ [g/cm³] of the glass particle deposition layer deposited per unit time is in a range of 0.70 to 0.90, inclusive.

16. The method of manufacturing the porous glass preform for an optical fiber according to claim 10, wherein the density $\rho_c$ [g/cm³] of the glass particle deposition layer deposited per unit time is in a range of 0.70 to 0.90, inclusive.

17. The method of manufacturing the porous glass preform for an optical fiber according to claim 11, wherein the density $\rho_c$ [g/cm³] of the glass particle deposition layer deposited per unit time is in a range of 0.70 to 0.85, inclusive.

18. The method of manufacturing the porous glass preform for an optical fiber according to claim 12, wherein the density $\rho_c$ [g/cm³] of the glass particle deposition layer deposited per unit time is in a range of 0.70 to 0.85, inclusive.

19. The method of manufacturing the porous glass preform for an optical fiber according to claim 1, allowing the variation in sweep pitch P to exceed range of a central value±10% for at least one value of R when R does not satisfy 0.5 L≤R≤0.8 L.

\* \* \* \* \*